May 17, 1932. K. EICHENAUER 1,858,807
CALCULATING MACHINE CONTROLLING ONE OR MORE SECONDARY MACHINES
Filed Aug. 11, 1928 8 Sheets-Sheet 1

INVENTOR:
Konrad Eichenauer
BY
Lorke, Kehlenbeck & Farley
ATTORNEYS

May 17, 1932.  K. EICHENAUER  1,858,807
CALCULATING MACHINE CONTROLLING ONE OR MORE SECONDARY MACHINES
Filed Aug. 11, 1928  8 Sheets-Sheet 3

May 17, 1932. K. EICHENAUER 1,858,807
CALCULATING MACHINE CONTROLLING ONE OR MORE SECONDARY MACHINES
Filed Aug. 11, 1928 8 Sheets-Sheet 4

Fig. 4.

INVENTOR:
Konrad Eichenauer
BY
ATTORNEYS

May 17, 1932. K. EICHENAUER 1,858,807
CALCULATING MACHINE CONTROLLING ONE OR MORE SECONDARY MACHINES
Filed Aug. 11, 1928 8 Sheets-Sheet 7

INVENTOR:
Konrad Eichenauer
BY
ATTORNEYS

May 17, 1932.  K. EICHENAUER  1,858,807

CALCULATING MACHINE CONTROLLING ONE OR MORE SECONDARY MACHINES

Filed Aug. 11, 1928   8 Sheets-Sheet 8

INVENTOR:
Konrad Eichenauer
BY
Lotka, Kehlenbeck & Farley
ATTORNEYS

Patented May 17, 1932

1,858,807

UNITED STATES PATENT OFFICE

KONRAD EICHENAUER, OF NEU-ROSSEN, NEAR MERSEBURG, GERMANY, ASSIGNOR TO RHEINISCHE METALLWAAREN- UND MASCHINENFABRIK, OF DUSSELDORF-DERENDORF, GERMANY, A CORPORATION OF GERMANY

CALCULATING MACHINE CONTROLLING ONE OR MORE SECONDARY MACHINES

Application filed August 11, 1928, Serial No. 298,938, and in Germany August 13, 1927.

This invention relates to a calculating machine for all species of calculations which serves as a primary machine to control a secondary machine, for instance a type-writer or a machine for punching holes in cards. The calculating machine is connected to the secondary machine in such a manner that with the use of electrical transmitting means by closing and opening of circuits, operations, corresponding to those effected in the primary machine by the usual key movements, are effected in the secondary machine by means of electromagnets provided in said secondary machine.

The present invention particularly relates to the transmitting gear necessary for the operation of the device which gear is connected to and operated by the keys of the calculating machine constructed and operating as described in the earlier United States Patent No. 1,773,392, granted August 19, 1930.

An object of the invention is to arrange and form the mechanism for the insertion of the number values and for the transfer of these values from the one machine to the other in such a manner that no alteration of the construction and of the position of the parts of the calculating machine is necessary and, in spite of the additional function, their manipulation is in no way impaired or rendered difficult.

Another object of the invention is to arrange and form the aforesaid mechanism in such a manner that damage to the delicate parts of the contact and transfer device, the entering of dust, and troubles caused by the entering of foreign bodies are absolutely prevented, and the exterior appearance of the calculating machine is hardly altered.

A further object of this invention is to arrange and form the aforesaid mechanism in such a manner that it is possible to construct its parts with certain tolerances and to manufacture and assemble the whole without difficulty.

In the accompanying drawings some modes of carrying out the invention are shown by way of example.

Figures 7, 11:
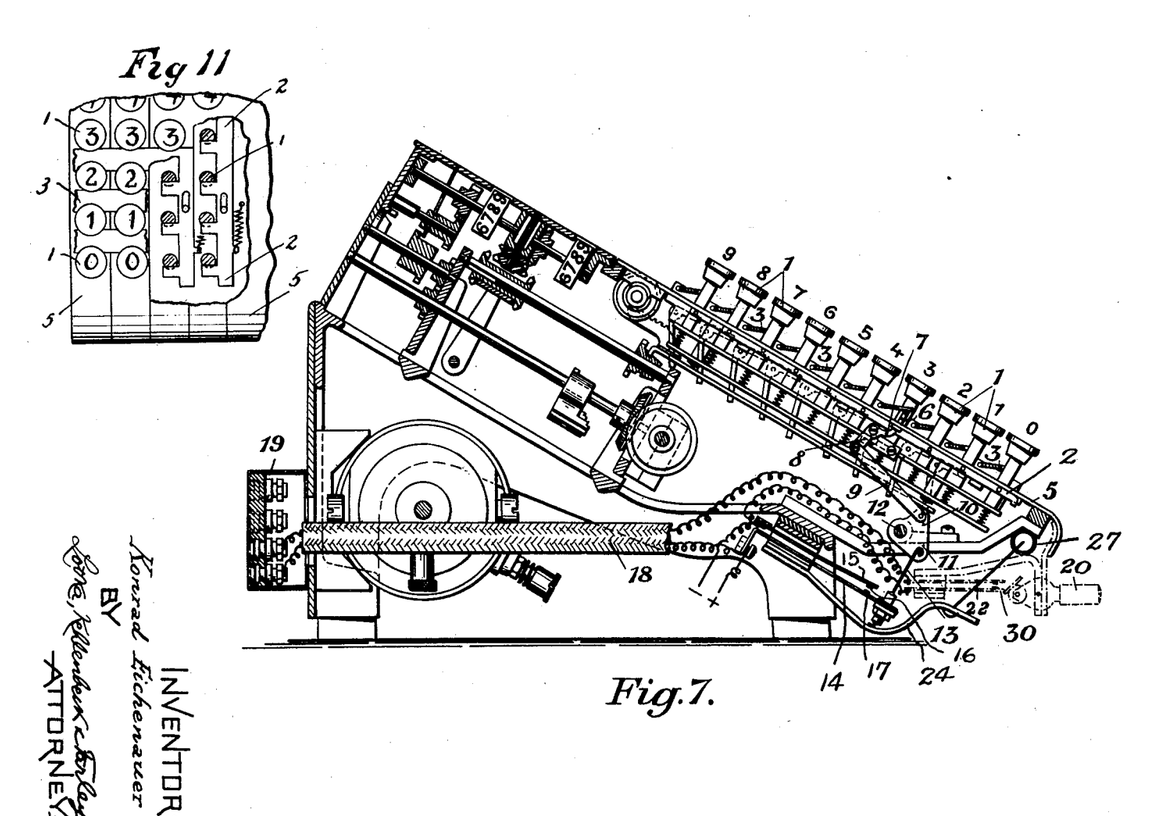
Fig. 7 is a sectional view of the calculating machine shown in Figs. 3 and 5.
Fig. 11 is a front elevation corresponding to Fig. 10, with some parts broken away and others in section.
Figures 8, 10:
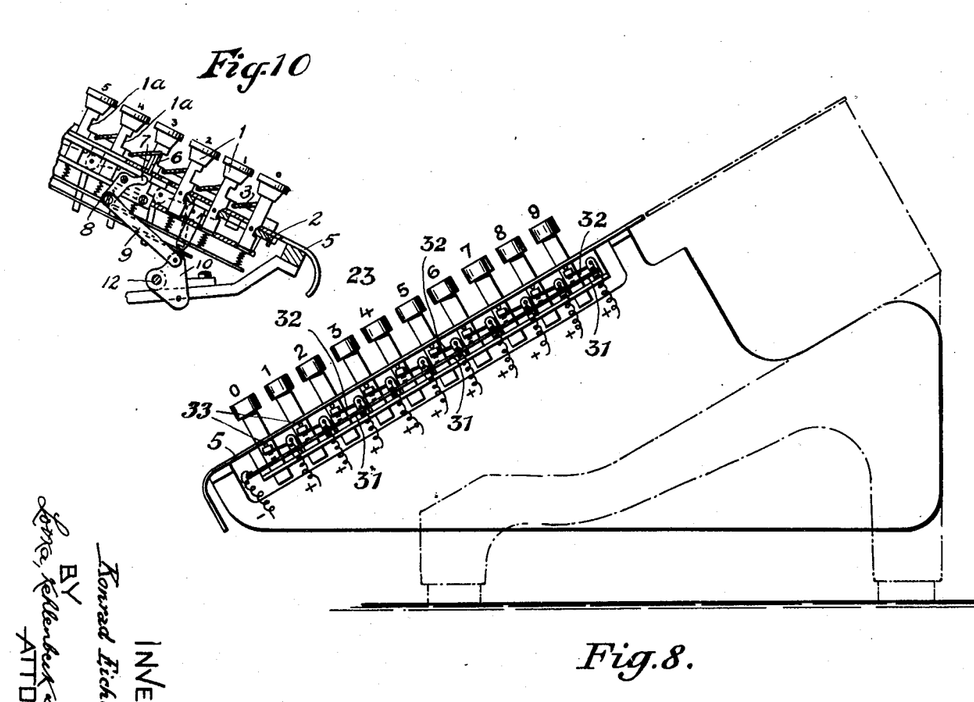
Fig. 8 is a section on line 8—8 of Fig. 6.
Fig. 10 is a partial sectional view of the lower right-hand portion of Fig. 7.

The keys 1 of the calculating machine are in a known manner provided with recesses 1a for engagement with the key locking rail 2 (Figs. 10 and 11). The length of said recesses 1a is a little greater than the thickness of the rail 2. The last part of the downward stroke of the key 1 is used to close a contact which is opened again as soon as the key 1, after release of the finger pressure, moves upwards under the action of its return spring. This upward movement is limited to such an extent that the locking rail 2 holds the depressed key 1 in a position in which the inserted number value remains in the machine.

In each of the constructions shown, illustrating a calculating machine for all species of calculation, all keys 1 of each row of keys of equal number value act upon a common transfer member which has the form of a cross strip 3 (Figs. 6 and 7) and is so arranged at the machine casing along the keys 1 as to be capable of being engaged by the keys and moved up and down. The strip or bar 3 is arranged at the side of the key 1 closely beneath or above the key board 5. In the constructions illustrated the strip 3 is arranged above the key board 5. The strips 3 present in equal number to the rows of keys require an equal number of pairs of journals, oscillating bearings or guides, the arrangement of which in the interior of the casing in addition to the other journals necessary, is rather difficult. The arrangement of these pairs of journals or bearings at the outer side of the casing, however, very much facilitates the arrangement of the other parts of the operating trains in the interior of the casing. The strips 3 are the only parts of the operating trains which are visible exteriorly; they may, however, be so arranged, that they are hardly noticed and do not in any way interfere with the operation of the machine.

Figure 5:
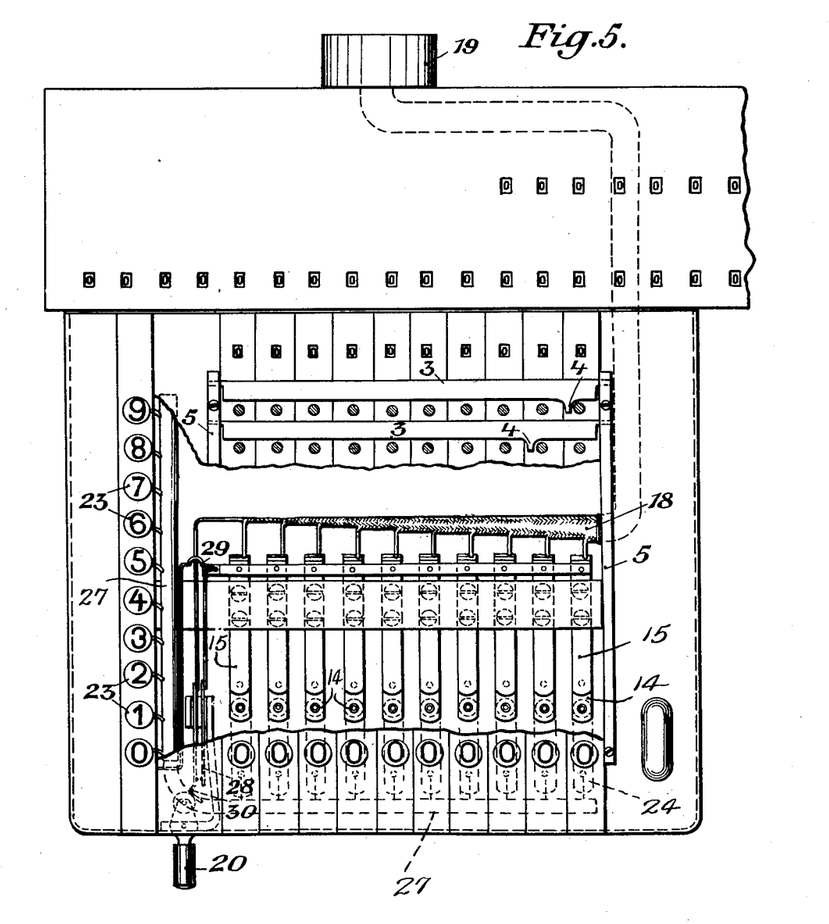
Fig. 5 is a top plan view of the calculating machine.
Figure 6:
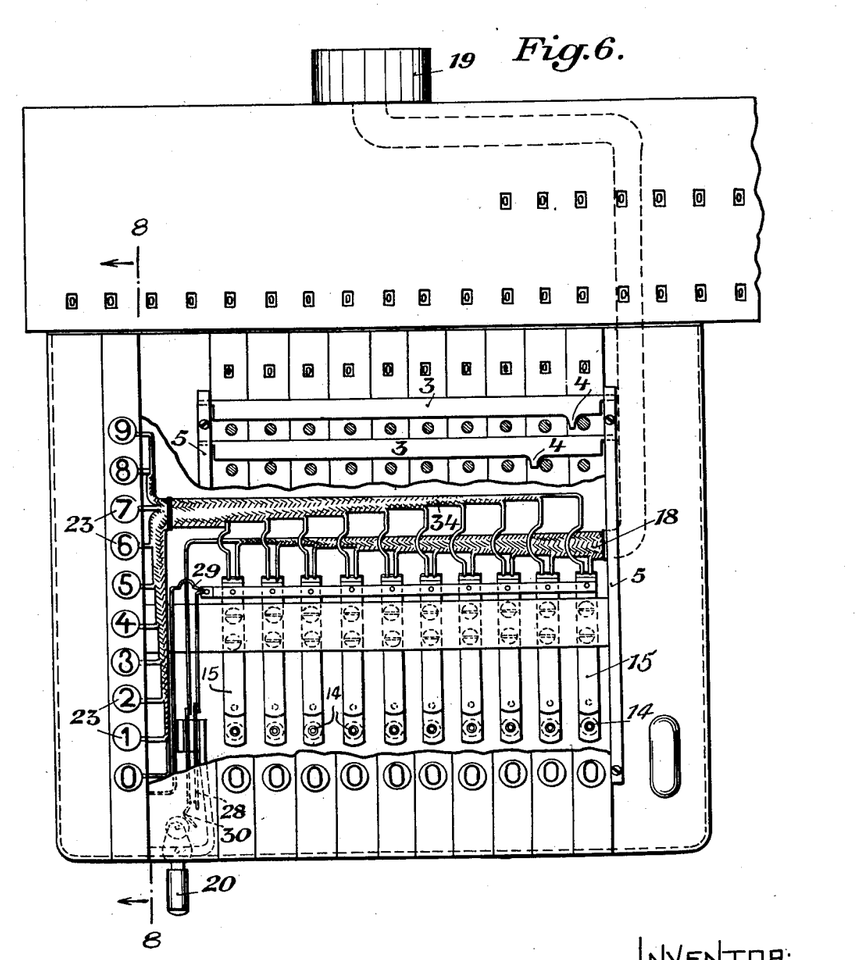
Fig. 6 is a view similar to Fig. 5 but showing a top plan view of the modification illustrated in Fig. 4.

Each cross strip or bar 3 is, as shown in Figs. 5 and 6, provided with a projection 4 the position of which is different for the several strips, i. e. for each row of keys staggered in the cross direction with regard to the adjacent strip for an amount equal to the distance between two consecutive keys 1. There are provided ten pairs of contacts 14, 15, each pair of which is associated with one of the number values 0—9 and is actuated by one of the strips 3. These pairs of contacts are arranged under the forward portion of the key-board, the pair of contacts associated with the number value 9 being arranged under the series of keys of the units place, the contacts associated with the numeral 8 being positioned under the series of keys of the tens place, etc.

Figures 1, 9:
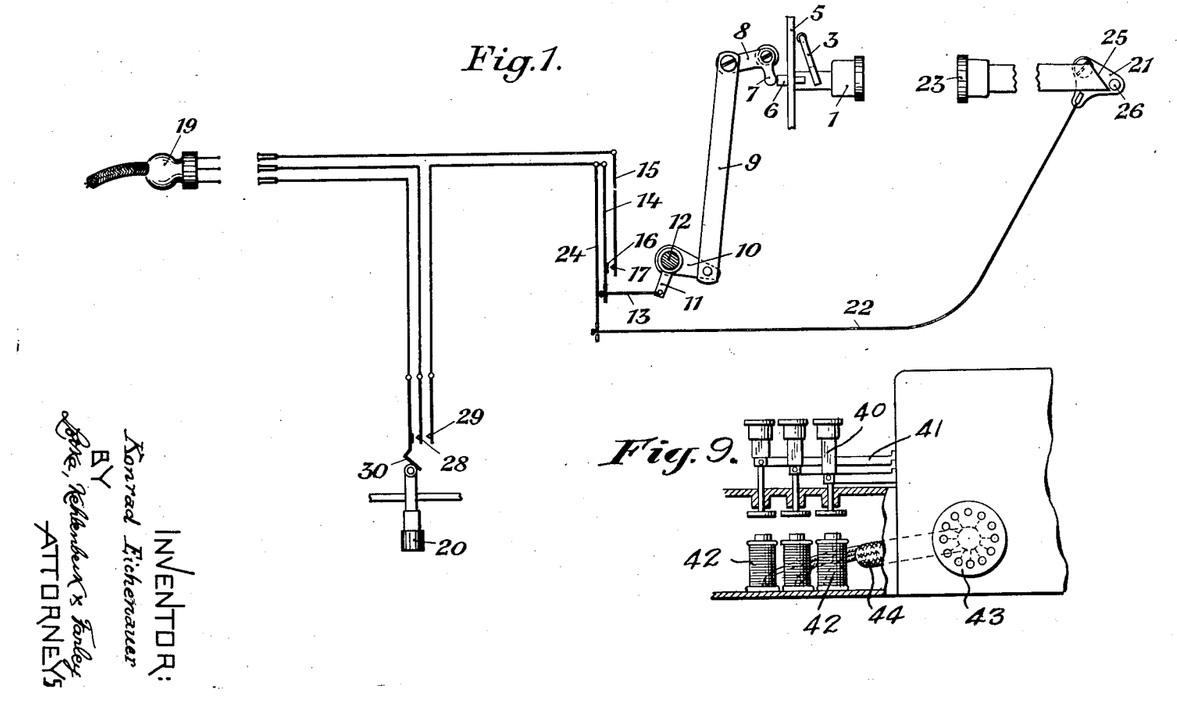
Figs. 1 and 2 are diagrammatic views showing generally two arrangements according to the invention.
Fig. 9 is a partial view of a card perforating machine controlled by the mechanisms shown in Figs. 1 to 8.

Electrical conductors connect the contacts 14, 15 with the electromagnets of a secondary machine, as is shown in British Patent No. 250,258 (see especially Fig. 9). The operating trains between the strips 3 and the contacts 14, 15 include the following mechanisms: Underneath each projection 4 of the strips 3 a hole (see Fig. 10) is provided in the key board 5 in which a pin 6 (Figs. 1, 2 and 7) is guided. Each of the pins 6 bears against the free end of an arm 7 of an angle lever 7, 8 suitably pivoted to the machine frame. The other arm 8 of the angle lever 7, 8 is connected to an arm 10 of a second angle lever 10, 11 by means of a link 9 the length of which is different for each row of keys. The other arm 11 of the angle lever 10, 11 pivotally arranged upon a shaft 12 common to the angle levers 10, 11 of all rows of keys, is connected, by means of a wire 13 (Figs. 1 and 7), to the contact member 14 which consists of a leaf spring fixed at one end. Above this spring 14 the similarly formed second contact member 15 is fixed to the machine frame. The resilient contact members 14, 15 carry contact pieces 16 and 17, respectively, of suitable metal. As shown in the drawings, the contact springs 14, 15 are, in the longitudinal direction of the machine, arranged side by side parallel to the rows of keys of equal number value. As stated, electrically conducting wires connect the springs 14, 15 to the electromagnets of the secondary machine, shown in Fig. 9. The conducting wires extending from the contact members 14, 15 are drawn together to a cable 18 (Figs. 3–6) leading from the interior of the calculating machine to a collecting plug box 19 provided at the back of the machine. The cable 18 contains twelve conductors, ten for the numbers 0, 1, 2 to 9 and two for the current supply and return. The single plug sockets in the collecting plug box 19 have unequal but definite distances from each other. The plugs of the corresponding collecting plug of the connecting cable are similarly arranged, so that the collecting plug may be introduced into the collecting plug box 19 in the correct position only. The calculating machine is connected to the secondary machine by conductors which are also united to a common cable carrying at both ends a suitable collecting plug which may be inserted in the plug box 19 of the calculating machine and a plug box provided at the secondary machine, respectively, in which terminate the conductors from the electromagnets.

From each key 23 of the row of multiplication- and division-keys an operating train must extend to the contact 14, 15, i. e., from each particular number key to the contact members which, as described above, are present for each number row of the main key board. These together are nine in number and are arranged parallel to each other and extend through the interior of the calculating machine. As the space available in the machine is very limited and it would be difficult to arrange nine operating connections composed of links and levers, I employ Bowden wires 22 in the operating trains. These wires are actuated by the angle levers 21 arranged under the multiplier keys 23 and operate on springs 24 which are disposed under the contact springs 14, 15. On depression of the key 23 the angle lever 21 is turned by the cooperation of the inclined surface 25 of the key shaft with the pin 26 fixed in the angle lever 21. Hereby the leaf spring 24 is drawn against the superimposed contact spring 14 which, being also moved against the spring 15, closes the contact at the contact pieces 16, 17 in exactly the same manner as on depression of one of the keys 1. The several Bowden wires 22 are arranged in a bent tube 27 (Figs. 5 and 7) which is provided with holes for the passage of the Bowden wires.

According to the modification shown in Figs. 2, 4, 6 and 8 a spring 31 is provided in the calculating machine beneath the row of the multiplication or division keys 23. Shiftable contacts 32 cooperate with this rail or bar 31. The contacts 32 are constructed as leaf springs fixed at one end and one of these contacts 32 is provided for each of the keys 23. The keys 23 carry laterally projecting pins 33 which on depression of the keys 23 come into contact with the leaf springs 32 and shift these against the rail or bar 31 for the purpose of closing the contact.

After release of the finger pressure upon the key 23, the latter is again returned into the original position by the quick upward springing of the contact 32. Conductors 34 lead from the contact members 32, 31 to the conductors controlled by the contact springs 14, 15, (or they may be connected to the contact springs directly) so that in this case also the transfer upon the contacts 14, 15 is effected upon depression of the keys 23.

Figure 2:
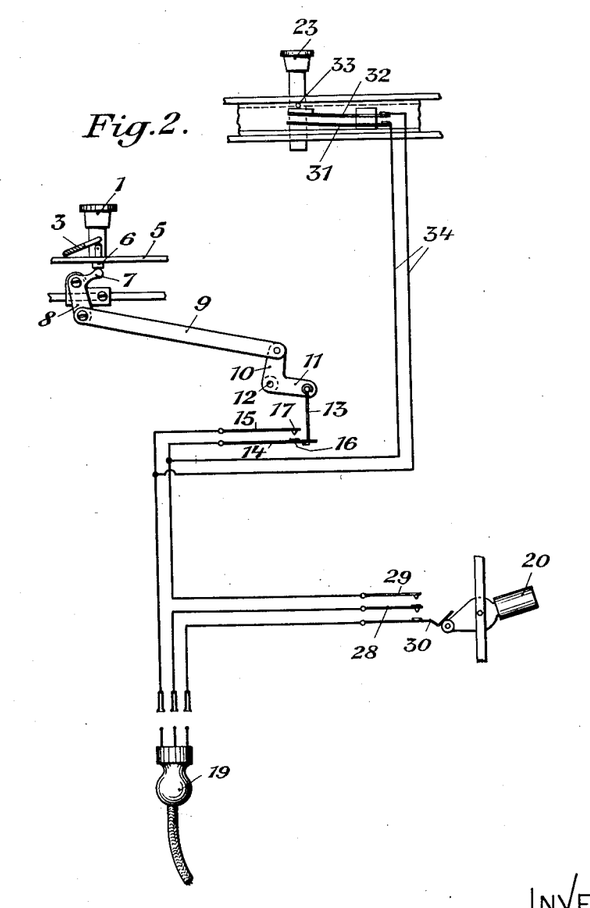
Figure 3:
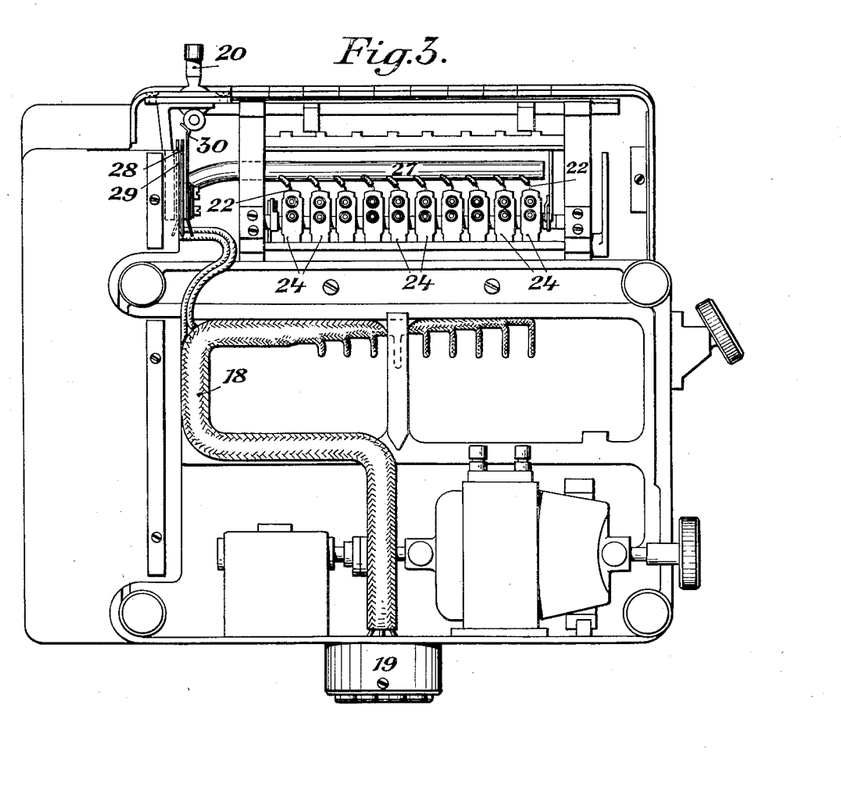
Fig. 3 is a bottom plan view of the calculating machine.
Figure 4:
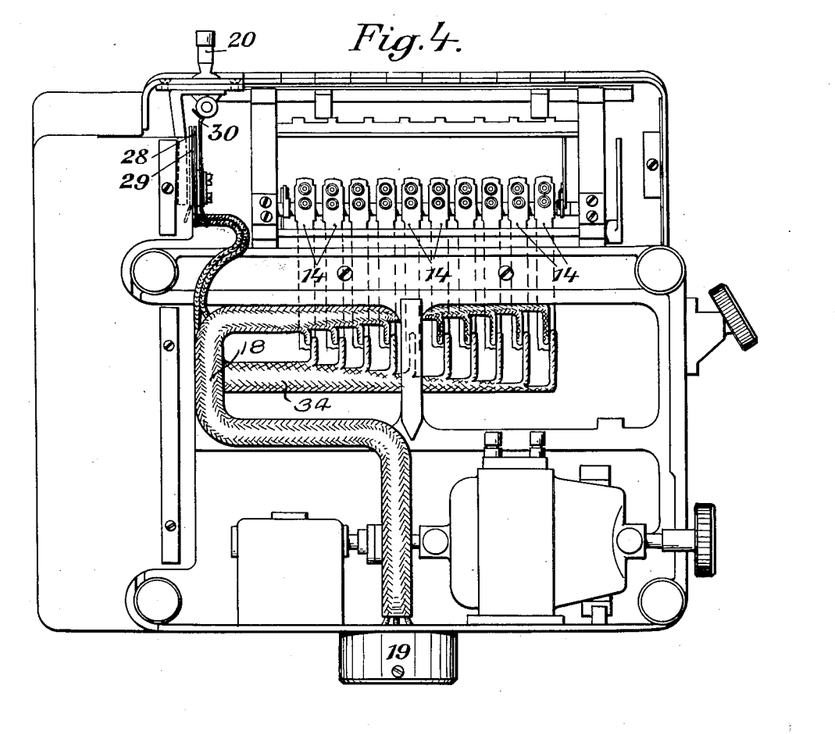
Fig. 4 is a view similar to Fig. 3 showing a slight modification.

The operation of the arrangement will be understood from the above description. On depression of the keys 1 of the main key board 5 the leaf spring 14 is bent and moved against the spring 15, so that, simultaneously with the depression of any of these keys 1, the corresponding contact pieces 16, 17 are brought together and the contact is closed. Hereby the value inserted in the calculating machine is in the secondary machine also written down or introduced in the form of one or more holes in a perforated card. Immediately after release of the finger pressure upon the key 1, the contact member 14 springs back and returns the actuating trains 7, 8, 9, 10, 11 to its original position. On depression of one of the keys 23 of the row of multiplication keys, the contacts 16, 17, of the leaf springs 14, 15 are closed, either by an upward movement of the corresponding leaf spring 24 under the action of one of the Bowden wires 22, or by the circuit closed by the contact springs 31 and 32 which are arranged in shunt to the contacts 16, 17 as shown in Fig. 2, so that the number values inserted in the row of multiplication keys 23 appear also in the secondary machine. In the same manner the result obtained by the calculation operations is transferred to the secondary machine or machines by depressing the keys of the calculating machine.

Fig. 9 shows a portion of a secondary machine in the form of a card perforating machine adapted to be controlled by one of the primary machines shown in Figs. 1 to 8. The keys of the secondary machine are indicated at 40 and are arranged to actuate the punches (not shown) of the machine through the levers 41. Beneath each key is located an electromagnet 42 which when electrically excited attracts and depresses its associated key and operates the corresponding card punch. The conductors from the primary machine are connected to the secondary conductors leading to the electromagnets 42 by means of the plug socket 43, the secondary conductors being combined into a cable 44.

The card being perforated in the secondary machine is moved one column to the left after every perforation of a digit as is described, for example, in United States Patent No. 1,110,261.

If either the calculating machine or the secondary machine is to be used separately, it is sufficient to shift the switch 20 into the position shown in Figs. 1 and 2. Of course, if both machines are to be operated simultaneously the switch lever 20 must be moved so as to bridge the contacts 28, 29 by the contact 30.

What I claim is:

1. In an apparatus for performing and recording all types of calculations and composed of a calculating machine and a recording machine electrically controlled by the keys of said calculating machine, in combination, rows of keys in said calculating machine, contacts associated with each row of similarly numbered keys and arranged to control electrical circuits leading to the recording machine, and operating trains between said contacts and said keys, and including a common transfer member for each row of keys of like number, such members being controlled by said keys, said contacts and said trains being arranged side by side and operatively offset continuously in the direction of the rows of keys of like number by the distance between two keys and disposed between the transverse rows of keys running from 0 to 9.

2. The combination as set forth in claim 1 wherein the operating trains for transmitting the movement of the keys to the contacts includes fixedly mounted angular levers between said transfer members and said contacts and links connected to said levers, said levers and links being arranged to return automatically to inoperative position upon return of the keys.

3. The combination as set forth in claim 1 wherein said contacts are mounted on springs which are tensioned when contact is made and are so connected to the operating trains that the latter is returned automatically to inoperative position upon release of the pressure on the key.

In testimony whereof I have affixed my signature.

KONRAD EICHENAUER.